United States Patent [19]

Fischbein et al.

[11] Patent Number: 5,366,534

[45] Date of Patent: Nov. 22, 1994

[54] GRANULAR POTASSIUM SULFATE PREPARATION AND PROCESS FOR PRODUCTION THEREOF

[75] Inventors: Milton Fischbein, Cold Lake Alberta, Canada; Arthur R. Shirley, Jr., Florence, Ala.

[73] Assignee: Sherritt Inc., Fort Saskatchewan, Canada

[21] Appl. No.: 984,068

[22] Filed: Nov. 30, 1992

[51] Int. Cl.$^5$ ............................................... C05D 1/02
[52] U.S. Cl. ................................... 71/63; 71/64.07; 71/64.11
[58] Field of Search ............... 71/63, 64.01, 64.03, 71/64.07, 64.08, 64.11, 64.13

[56] References Cited

U.S. PATENT DOCUMENTS

| | | | |
|---|---|---|---|
| 3,620,709 | 4/1969 | Petkovsek | 71/63 |
| 4,385,920 | 5/1983 | Dancy et al. | 71/53 X |
| 4,743,289 | 5/1988 | Mickus et al. | 71/63 X |
| 4,846,871 | 7/1989 | Detroit | 71/63 X |

FOREIGN PATENT DOCUMENTS

| | | | |
|---|---|---|---|
| 6129610 | 10/1981 | Japan | 71/63 |
| 0998448 | 2/1983 | U.S.S.R. | 71/63 |

*Primary Examiner*—Ferris Lander

[57] ABSTRACT

A granulated potassium sulfate product suitable for coating or other rigorous handling and a process for producing the product. The granulated potassium sulfate product comprises a hardening agent, e.g., ammonium phosphate, and a coating agent, e.g., aluminum sulfate.

13 Claims, No Drawings

GRANULAR POTASSIUM SULFATE PREPARATION AND PROCESS FOR PRODUCTION THEREOF

FIELD OF THE INVENTION

The present invention relates to a granulated potassium sulfate product and to the process for producing same. More specifically, the present invention relates to a granular potassium sulfate product that has exceptional hardness and resistance to abrasion to facilitate blending and to permit coating of the granule for use in controlled release fertilizers. The invention further relates to a process for producing such a potassium sulfate product and to the novel controlled release product produced when such potassium sulfate product is coated with a material giving controlled release characteristics.

BACKGROUND OF THE INVENTION

In many applications, it is preferred if all of the different soil and crop requirements for individual nutrient components (based on potassium, nitrogen and phosphorus) are in the form of granules which are approximately similar to each other in terms of dimensions and physical characteristics so that a composite fertilizer, which is generally homogeneous, may be obtained when such granules are mixed. Additionally, it is preferred if such fertilizers may be manufactured in such a way that the release of the nutrient from the fertilizer granulars may be controlled. One method of making a fertilizer controlled release is to coat it with a material that gives controlled release characteristics. This can be achieved in many ways including coating with a polymer in a fluidized or spouted bed.

In many of the traditional fertilizer preparations, the potassium nutrients are provided in the form of potassium chloride. In certain applications, low chloride or no chloride fertilizers are desirable. For example, in the nursery business, some species of potted plants are chloride or salt sensitive and thereby require a fertilizer having little or no chloride. Additionally, in high salt areas such as found near the ocean, it is desirable to use fertilizers which do not contribute further to the salt problems. In many such cases where a soil is high in salt, plant growth can be impeded due to the dehydration if a chloride fertilizer is used.

One such chloride-free compound for use in providing potassium nutrients in fertilizer applications is potassium sulfate. However, it was found that all commercially available potassium sulfate was totally unsuitable for applications where it would be subject to crushing and abrasion such as in the process of coating for controlled release applications or in rigorous mixing or blending applications. In particular, it was found that such commercially available potassium sulfate deteriorated into dust or broke into pieces during coating or other processing that subjected the granules to impact and abrasion.

To be suitable for coating, granules have to be round, in an acceptable size range suitable for blending, and have a hardness and abrasion resistance which prevents the granules from breaking up under the rigorous handling of the coating process or under rigorous mixing or blending.

SUMMARY OF THE INVENTION

The present invention resides in providing a novel granular potassium sulfate product suitable for coating or other rigorous handling. The novel granular potassium sulfate product is produced by binding the potassium sulfate with an agent capable of imparting hardness thereto, granulating same, and coating the resulting hardened granules with a coating imparting abrasion resistance thereto.

The present invention also provides a novel chloride free controlled release fertilizer when the novel granular potassium sulfate product is coated with a material which provides controlled release characteristics.

Suitable agents capable of binding with and imparting hardness to the potassium sulfate are ammonium phosphates, or a mixture of an ammonium phosphate and a lignosulfonate. Such hardening agents also provides some plasticity or flexibility to the potassium sulfate granules. A suitable coating agent capable of imparting abrasion resistance to the granules is aluminum sulfate (alum).

Preferably, the granular potassium sulfate product comprises of the order of about 75 to 90% by weight potassium sulfate, of the order of about 4 to 15% by weight of the hardening agent, and of the order of about 2 to 5% by weight of the coating agent.

According to the invention, the novel granular potassium sulfate product is produced by intimately mixing and wetting the potassium sulfate and the hardening agent to effect the binding thereof, granulating the wetted mixture and adding the coating agent to coat the resulting granules. The granules are then dried and screened ready for coating with a controlled release coating or mixing with other granular products. Preferably, the potassium sulfate, the hardening and the coating agent are first individually ground to a powder and the powdered potassium sulfate and hardening agent are premixed and prewetted to bind them together and then introduced into a granulator where the powdered coating agent is added prior to discharge of the granulated mixture from the granulator. Outsized granules separated by the screening may be recycled and the process may be made continuous. The finished granular potassium sulfate product may then be blended with other granular fertilizer products or may be coated with a polymer to form controlled release chloride free fertilizer.

The potassium sulfate granules of the invention have a Pfizer hardness of at least 7, preferably of at least 8, most preferably of at least 9. In addition, the granules have an MCC hardness (abrasion resistance) after 15 minutes of at least 85, most preferably at least 90 and most preferably have an abrasion resistance after 60 minutes of at least 50. In addition, more than about 80% of the potassium sulfate granules are in the range of +10 to −6 Tyler mesh screen size, preferably more than about 85% within this range and most preferably at least about 90% of the granules are within this range.

DETAILED DESCRIPTION OF THE PREFERRED EMBODIMENTS

In its preferred form, the granular potassium sulfate product of the present invention comprises from about 75 to 90% by weight potassium sulfate, from about 4 to 15% by weight of an ammonium phosphate as the hardening agent bound to the potassium sulfate, and from about 2.0 to 5.0% by weight of aluminum sulfate (alum)

as the coating agent, with the granules having a Pfizer hardness of at least 7 and an MCC hardness or abrasion resistance of at least 85 after 15 minutes and a size such that at least about 80% of the granules are in the range of +10 to −6 Tyler mesh screen.

Lignosulfonates have been found useful as wetting agents to assist the water in the binding of the wetted ammonium phosphate and potassium sulfate and lignosulfonate solids may make up to about 5% by weight of the finished granular potassium sulfate product. Potassium lignosulfonate is preferred since it increases the potassium content of the granules but calcium lignosulfonate may also be used. The ammonium phosphate preferably is mono ammonium phosphate (MAP) but di-ammonium phosphate (DAP) can also be used.

The process for producing the novel granular potassium sulfate product of the invention preferably comprises individually grinding the potassium sulfate, the ammonium phosphate, e.g. mono ammonium phosphate, and the alum to fine powder having a size range of about 50 Tyler mesh to 200 Tyler mesh. The powdered potassium sulfate and MAP are then premixed and prewetted with water and a lignosulfonate preferably potassium lignosulfonate in a high shear mixing device such as a turbulator. The wetted mixture is then fed into a suitable granulator such as a drum granulator and the wetness controlled in the granulator to produce the desired granular size. Again, a lignosulfonate solution has been found useful in controlling the wetness of the mixture being granulated. The alum to effect coating of the granules is introduced into the granulator near the discharge end and the resulting product is then screened for sizing and dried. Where the potassium sulfate granular product is to be used as a controlled release fertilizer it is then, for example, coated with a polymer in a known manner such as in a fluidized or spouted bed to produce a novel chloride free controlled release fertilizer.

The coating agent alum provides the granules with a relatively smooth and shiny surface which aids in increasing the abrasion resistance and the integrity of the granules preventing them from disintegrating upon contact with each other. The alum is provided in a ratio of about 2.0 to 5.0% by weight of the final granule, and preferably from about 2.3 to 3.5% by weight.

In one example of producing the novel potassium sulfate granular product, commercially available crystalline potassium sulfate was ground into a fine powder in a size range of 50 Tyler mesh to 200 Tyler mesh. Commercially available alum and MAP were also ground to about the same mesh size. The ground potassium sulfate and ground MAP were blended together and were then mixed intimately in a turbulator with potassium lignosulfonate. Potassium lignosulfonate with about 57% solids was used and was diluted to between 2 to 1 and 8 to 1 with water.

The mixture was then introduced into a 36 inch diameter granulating drum where the material was granulated into round granules. The size of the granules was controlled by controlling the wetness of the mixture being ground by introducing potassium lignosulfonate diluted as aforesaid into the granulating drum. The ground alum was added adjacent to the discharge end of the granulating drum to coat the granule. The granules were then dried in another rotating drum using warm air. The dried granules were screened, and the outsized granules were separated from the onsize produced. The onsize product (−6+10 Tyler mesh) was sent to a fluid bed dryer for further drying and then to a fluid bed cooler for cooling before being conveyed to drums for storage and shipping.

In carrying out the above described example the combination of raw materials used was as follows:

| | |
|---|---|
| Potassium sulfate | 84.0% |
| Mono Ammonium Phosphate (MAP) | 8.4% |
| Aluminum sulfate (alum) | 2.5% |
| Potassium lignosulfonate solids | 5.0% | but it will be understood that a wide range of concentrations can be used.

The MAP which has been found to impart hardness to the granules also imparts a measure of plasticity or flexibility thereto. Di-ammonium phosphate or DAP provides similar results.

While potassium lignosulfonate is preferred because of the potassium content, other Lignosulfonates such as calcium lignosulfonate may be used. The lignosulfonate has been found to assist in the wetting and therefore the binding of the potassium sulfonate and MAP particles but binding takes place under wetting without the presence of the lignosulfonate. The concentration of the lignosulfonate may vary from 0 to about 5% by weight.

The coating agent alum provides a smooth and shiny surface to the hardened potassium sulfonate granules and increases their resistance to abrasion so that the granules maintain their integrity under vigorous contact during, for example, the coating process to convert them into a controlled release fertilizer in a fluidized or spouted bed.

It will be understood that the granulation may be carried out by other suitable granulating devices such as pan granulators and other driers may be employed.

The particle size produced by the granulator is controlled by control of the wetting of the mixture being granulated and in this respect such wetting can hie facilitated by the introduction of a solution of lignosulfonate solids in water, preferably potassium lignosulfonate solids, in the water introduced into the granulator.

The outsized granules separated after the screening can be optionally recycled back into the process. The undersized granules are conveyed to a hopper where they can, if desired, be fed back to the granulator either directly or via the turbulator. The oversized granules after being crushed may be similarly recycled to the granulator.

The Pfizer hardness of the granules is measured with a commercial compression tester such as a Chatillon Compression Tester. At least 25 granules within the Tyler mesh size range from a given product run are tested individually and the average of these measurements is taken as a Pfizer hardness of the product from which the test granules were taken. The granules are place one at a time on a flat surface provided on the compression tester. Pressure is applied to each granule using a flat end rod attached to the compression tester and a guage mounted in the compression tester measures the pressure required to fracture the granule. The MCC hardness or abrasion resistance of the granules is measured utilizing for example a CE Tyler portable sieve shaker model RX. 100 grams of granules of a −6 to +10 mesh size are placed on a #10 mesh screen along with a 120⅜" steel bails. The screen is positioned just above a pan and shaken for one hour on the portable sieve shaker. After shaking the amount of material, the pan was measured to give an indication of the amount of material remaining on the mesh. The amount of material remaining on the mesh is an indication of the abrasion resistance of the material.

In one pilot plan run, as an example, granulation was conducted at a rate of approximately 200 pounds per hour utilizing flow rates (pounds per hour) as follows:

| | |
|---|---|
| Potassium sulfate | 150.00 |
| MAP | 15.00 |
| Alum | 4.5 |
| Potassium lignosulfonate to turbulator | 6.6 (53% of solids) |
| Potassium lignosulfonate to granulator | 23.4 (53% of solids) |

The granules were dried in the pre-drying drum at 183° F. and in the fluidized bed dried at 210° F. Product size was between about 91.1 and 92.6 on the Tyler mesh −6 to +10 range at a Pfizer hardness of about 8 and abrasion resistance of 96.3 at 30 minutes and 94.0 at 60 minutes.

Although various preferred embodiments of the present invention have been described herein in detail, it will be appreciated by those skilled in the art, that variations may be made thereto without departing from the spirit of the invention or the scope of the appended claims.

What is claimed is:

1. A granular potassium sulfate composition comprising bound granules of a mixture of:
   a) potassium sulfate;
   b) from about 4 to 15% by weight of ammonium phosphate; and
   c) from about 2 up to about 5% by weight of a lignosulfonate;
said granules further characterized as being coated with alum, imparting abrasion resistance to said granules.

2. A granular potassium sulfate composition as claimed in claim 1 having a Pfizer hardness of at least 7.

3. A granular potassium sulfate composition as claimed in claim 2 having an MCC hardness after 15 minutes of at least about 85%.

4. A granular potassium sulfate composition as claimed in claim 3 in which at least about 80% of the granules are in the size range on a Tyler mesh of −6 to +10.

5. A granular potassium sulfate composition as claimed in claim 4, further coated with a coating that provides controlled release characteristics.

6. The composition of claim 1 wherein said ammonium phosphate is selected from mono-ammonium phosphate and di-ammonium phosphate.

7. The composition of claim 1 wherein said potassium sulfate is present in said granules at a level of at least about 75% by weight.

8. The composition of claim 1 wherein said granules are coated with from about 2 to 5% by weight alum.

9. The composition of claim 1 wherein said lignosulfonate is potassium lignosulfonate.

10. A process for preparing a granular potassium sulfate product comprising:
    a) forming a wetted mixture comprising finely divided potassium sulfate, from about 4 to 15% by weight ammonium phosphate and from about 2 to about 5% by weight of lignosulfonate;
    b) granulating said wetted mixture to form bound granules; and
    c) overcoating said bound granules with alum, for imparting abrasion resistance to said granules.

11. The process of claim 10 wherein said granules are coated with from about 2 to 5% by weight alum.

12. The process of claim 10 wherein at least about 80% of said granules are in the size range of Tyler mesh of −6 to +10.

13. The process of claim 10 wherein said wetted mixture is granulated by tumbling in a rotary mixer.

* * * * *